United States Patent
Gintis

(10) Patent No.: US 9,641,419 B2
(45) Date of Patent: May 2, 2017

(54) METHODS AND SYSTEMS FOR PROVIDING BACKGROUND PRETESTING OF COMMUNICATIONS OR STORAGE NETWORK EQUIPMENT

(71) Applicant: Ixia, Calabasas, CA (US)

(72) Inventor: Noah Gintis, Westlake Village, CA (US)

(73) Assignee: Ixia, Calabasas, CA (US)

( * ) Notice: Subject to any disclaimer, the term of this patent is extended or adjusted under 35 U.S.C. 154(b) by 290 days.

(21) Appl. No.: 14/581,931

(22) Filed: Dec. 23, 2014

(65) Prior Publication Data
US 2016/0182310 A1    Jun. 23, 2016

(51) Int. Cl.
*G06F 11/00* (2006.01)
*H04L 12/26* (2006.01)

(52) U.S. Cl.
CPC .......... *H04L 43/50* (2013.01); *H04L 43/0811* (2013.01); *H04L 43/10* (2013.01)

(58) Field of Classification Search
USPC .......................................................... 714/25
See application file for complete search history.

(56) References Cited

U.S. PATENT DOCUMENTS

| | | | | |
|---|---|---|---|---|
| 7,730,029 | B2* | 6/2010 | Molotchko | G06F 11/2097 |
| | | | | 707/613 |
| 2008/0010523 | A1* | 1/2008 | Mukherjee | G06F 11/3414 |
| | | | | 714/25 |
| 2015/0106670 | A1* | 4/2015 | Gintis | H04L 43/045 |
| | | | | 714/712 |

OTHER PUBLICATIONS

"IxNetwork™ AVB Solution," Data Sheet, Document No. 915-1889-01 Rev A, www.ixiacom.com, pp. 1-18 (Oct. 2014).

* cited by examiner

*Primary Examiner* — Sarai Butler
(74) *Attorney, Agent, or Firm* — Jenkins, Wilson, Taylor & Hunt, P.A.

(57) ABSTRACT

Methods, systems, and computer readable media for background testing of communications or storage network equipment are provided. One method includes receiving a control plane definition from a user. The control plane definition may specify emulated network equipment and network protocols run by the emulated network equipment. The method further includes, after receiving the control plane definition, automatically performing at least one background test during an idle time period by sending traffic from the emulated network equipment to at least one device under test and outputting results of the at least one background test to the user.

29 Claims, 11 Drawing Sheets

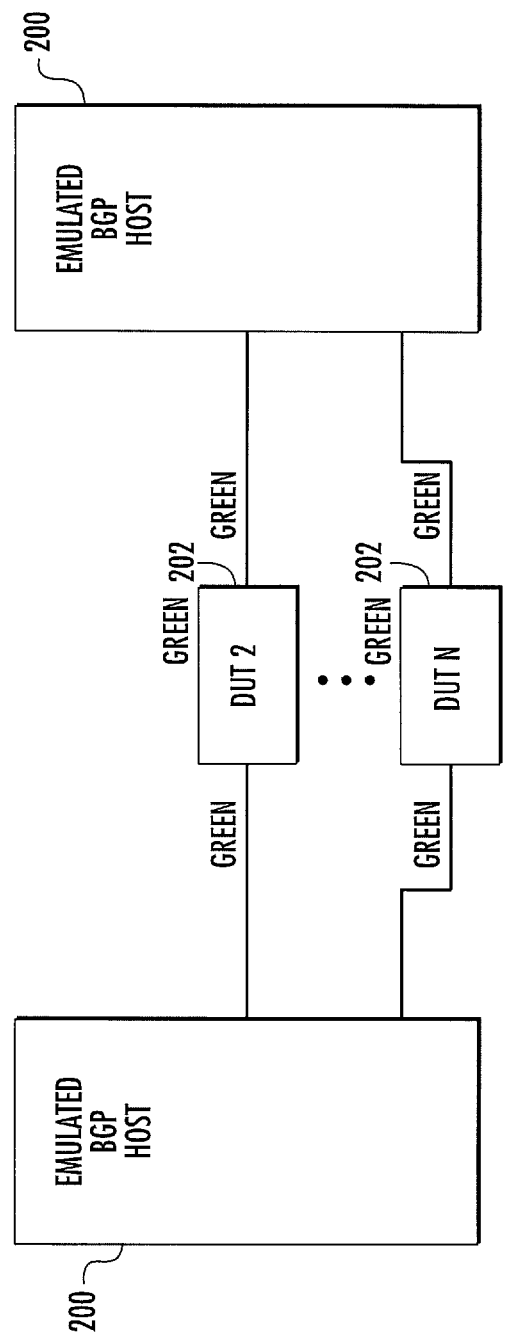

METHODS AND SYSTEMS FOR PROVIDING BACKGROUND PRETESTING OF COMMUNICATIONS OR STORAGE NETWORK EQUIPMENT

TECHNICAL FIELD

The subject matter described herein relates to testing communications or storage network equipment. More particularly, the subject matter described herein relates to methods, systems, and computer readable media for background testing of communications or storage network equipment.

BACKGROUND

When testing communications or storage network equipment, it is desirable to accurately identify the causes of errors in the test system configuration and in the devices under test as soon as possible. For example, it may be desirable to identify connectivity errors between network test equipment and devices under test so that the connectivity errors can be corrected before data plane testing is performed. It may also be desirable to identify protocol conformance errors early in the testing process.

When initiating a network test, a user typically starts by defining the control plane, followed by defining the data plane, and then by starting the data plane tests. Defining the control plane includes specifying, via a user interface to the test system, the nodes involved in the testing, the connections between the nodes, and the protocols implemented by the nodes. Defining the data plane includes specifying the message traffic that will be communicated between nodes in the data plane tests. After the control plane is defined but prior to executing the data plane tests, there is an idle time period. The idle time period may last at least for the duration of time for the user to define the data plane traffic to be used in the data plane tests. It may be desirable to use this and/or other idle time periods to achieve some of the aforementioned goals.

Accordingly, there exists a need for improved methods, systems, and computer readable media for background testing of communications or storage network equipment.

SUMMARY

Methods, systems, and computer readable media for background testing of communications or storage network equipment are provided. One method includes receiving a control plane definition from a user. The control plane definition may specify emulated network equipment and network protocols run by the emulated network equipment. The method further includes, after receiving the control plane definition, automatically performing at least one background test during an idle time period by sending traffic from the emulated network equipment to at least one device under test and outputting results of the at least one background test to the user.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3D is a network diagram illustrating yet another alternate embodiment of displaying results of the connectivity test illustrated in FIG. 3A according to an embodiment of the subject matter described herein;

DETAILED DESCRIPTION

The subject matter described herein relates to automatic background testing of communications or storage network equipment. Rather than receiving control plane information from the user and remaining in an idle state while the user defines the data plane tests, a network equipment test device described herein automatically implements background testing of communications network equipment during the idle time period. The background testing may be implemented after the control plane is defined yet before a first data plane test is initiated, between successive data plane tests, during data plane testing (if sufficient processing resources are available), and/or after data plane testing. By automatically performing background testing of communications network equipment, connectivity, conformance, and other errors can be accurately and rapidly identified so that the impact on data plane tests can be reduced or detected and corrected.

The subject matter described herein may be implemented on a network equipment test device that comprises a special purpose computing platform for testing communications network equipment. Such a platform improves the technological areas of communication and storage network equipment testing by rapid identification of connectivity, protocol conformance, and other errors and communication of meaningful test results to the user. It should also be noted that the network equipment test device may be a virtual device that shares access to underlying hardware with other network equipment test devices and/or devices under test through a virtualization layer, such as a hypervisor.

Figure 1:
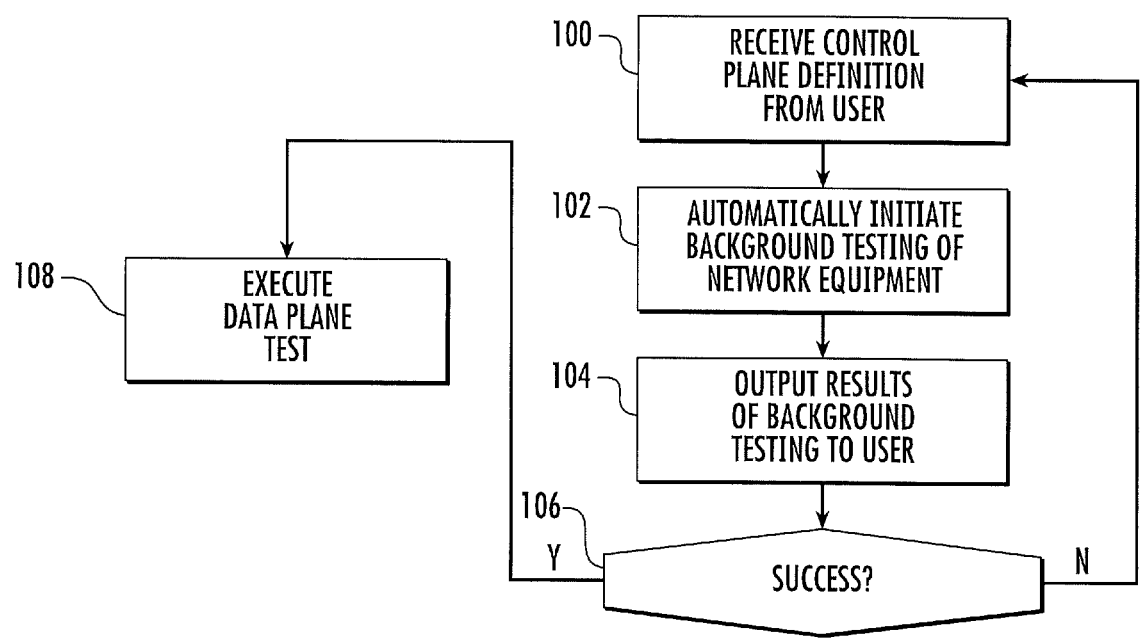
FIG. 1 is a flow chart illustrating an exemplary process for background testing of communications or storage network equipment according to an embodiment of the subject matter described herein.
Figure 2:
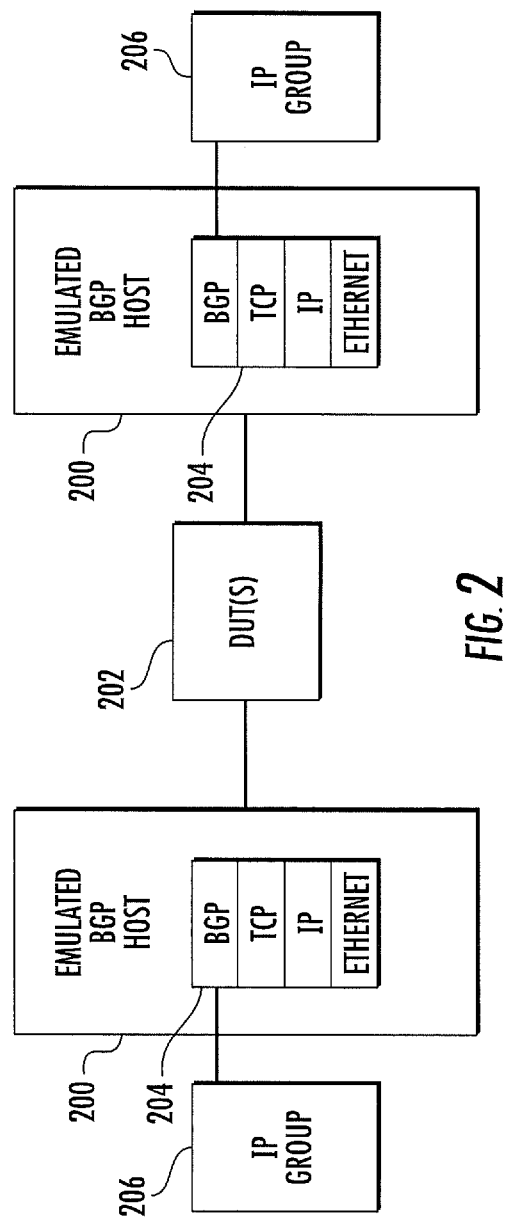
FIG. 2 is a block diagram illustrating an exemplary control plane test configuration according to an embodiment of the subject matter described herein.

FIG. 1 is a flow chart illustrating an exemplary process for background testing of communications or storage network equipment according to an embodiment of the subject matter described herein. Referring to FIG. 1, step 100, a control plane definition is received from the user. The control plane definition may include a definition of communicating endpoints and protocol stacks executed by the endpoints. FIG. 2 illustrates an example of a control plane definition that may be received from the user. In the illustrated example, the control plane definition includes configuration of network equipment test devices 200 to emulate border gateway protocol (BGP) hosts that test one or more devices under test 202. Each network equipment test device 200 includes a communication protocol stack 204. Because devices 200 are emulating the BGP protocol, each protocol stack 204 may include a BGP layer, a transmission control protocol (TCP) layer, an Internet protocol (IP) layer and an Ethernet layer. In addition, the BGP layer may advertise IP group routing information 206 to devices under test 202 so that devices under test 202 will know to route packets intended for IP groups represented by IP group routing information 206 through the respective BGP host emulated by network equipment test device 200. It should also be noted that although separate network equipment test devices 200 are illustrated in FIG. 1, as single network test device 200 may emulate multiple BGP hosts. In addition, network equipment test devices may be implemented using hardware shared by devices under test and/or other network equipment test devices where access to the hardware is mediated through a virtualization layer, such as a hypervisor.

Although BGP is illustrated as an example in FIG. 2, network equipment test devices 200 may emulate any suitable hosts and protocol stacks, depending on the functionality of devices under test 202 that is desired to be tested. The user plane definition may be received from the user via a graphical user interface or other suitable user interface to network equipment test device 200.

Returning to FIG. 1, in step 102, background testing of the communications network equipment is automatically initiated (e.g., without manual start input from a user). The background testing may be initiated after the control plane definition is received from the user and prior to, during, between, or after data plane tests. In one embodiment, the background testing may occur while the user is inputting the data plane definition into the user interface so that the user will know whether or not to run the data plane tests based on results of the background test. This embodiment is shown in FIG. 1.

In step 104, results of the background testing are output to the user. In step 106 it is determined whether results of the background testing indicate that the background test completed without errors. Step 106 may be performed automatically by network equipment test device 200 or manually by the user after network equipment test device 200 displays results of the background testing. If the results indicate completion of the background testing without errors, control proceeds to step 108 where the data plane tests are executed. Examples of data plane tests that may be executed load tests and stress tests where heavy message traffic loads are sent to the devices under test and the performance of the devices under test is monitored during the loading. If the results of the background test do not indicate error free completion of the background tests, control returns to step 100 where the user can update or reenter the control plane definition or seek to determine the cause of the error.

Figure 3A:
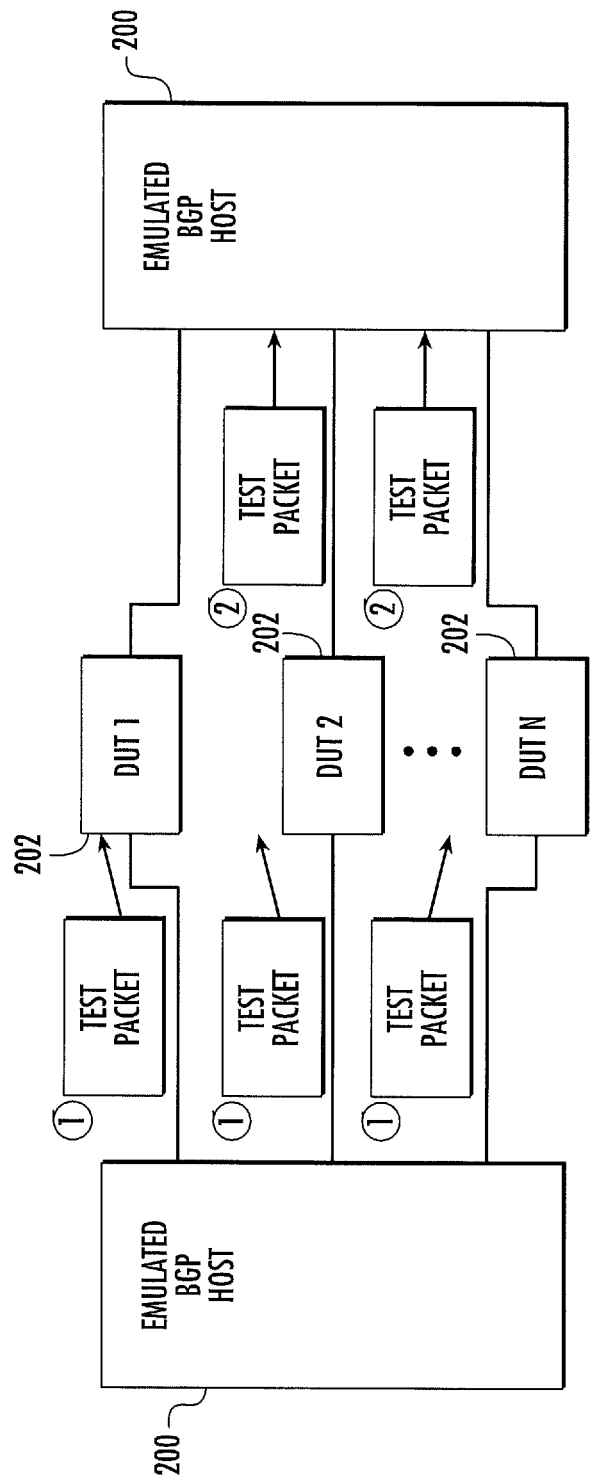
FIG. 3A is a network diagram illustrating an exemplary background connectivity test according to an embodiment of the subject matter described herein.

One type of background test that may be automatically executed by network equipment test device 200 during an idle time period is a connectivity test. FIG. 3A illustrates an example of a connectivity test. In FIG. 3A, network equipment test device 200 transmits a test packet over each of a plurality of different links from network equipment test device 200, through devices under test 202, and to a destination network equipment test device 200. The packet may be any suitable packet for testing connectivity, such as a packet Internet groper (PING) packet. In the illustrated example, the packet that passes through DUT 1 is dropped and not received by the receive port on the destination network equipment test device 200, and the packets transmitted through DUT 2-DUT n are received by the destination network equipment test device 200. The dropping of the one packet may have been caused by a problem with the configuration of DUT 1, a connectivity error between DUT 1 and network equipment test device 200, or a problem with one of the links between DUT 1 and network equipment test devices 200. Information indicative of the failure of the background connectivity test and the responsible nodes and links may be output to the user.

Figure 3B:
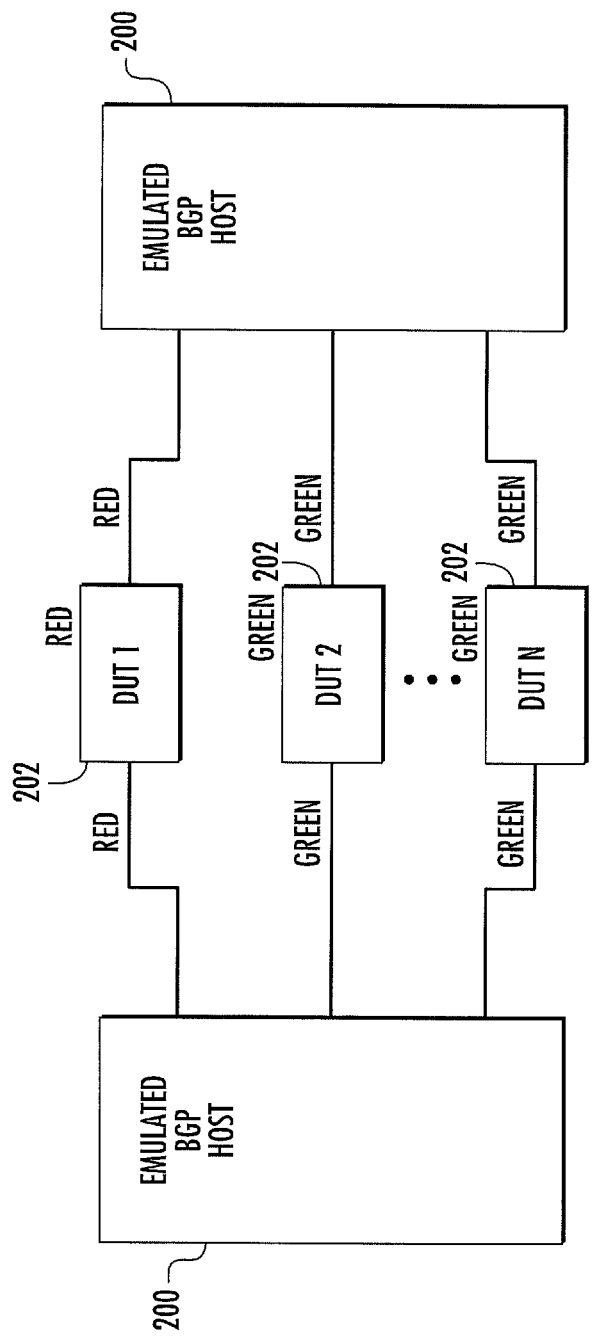
FIG. 3B is a network diagram illustrating one method for displaying results of the connectivity test illustrated in FIG. 3A according to an embodiment of the subject matter described herein.

FIG. 3B illustrates one example of how results of the test in FIG. 3A may be output to the user. In FIG. 3B, the link and the device under test, DUT 1, that failed to successfully pass the test packet to the destination network equipment test device 200 during the connectivity test are displayed in red. The remaining DUTs, DUT 2 through DUT N and their associated links may be displayed in green to indicate successful passage of the packets through these DUTs and links to the destination network equipment test device 200. In the drawings, the words "red" and "green" are shown adjacent to the links to indicate how the links may be color coded in displaying results of the background testing to the user. It is understood in a graphical display output by a computer, the actual links would be color coded in the indicated colors. The words "red" and "green" are used herein to obviate the need for color drawings.

Figure 3C:
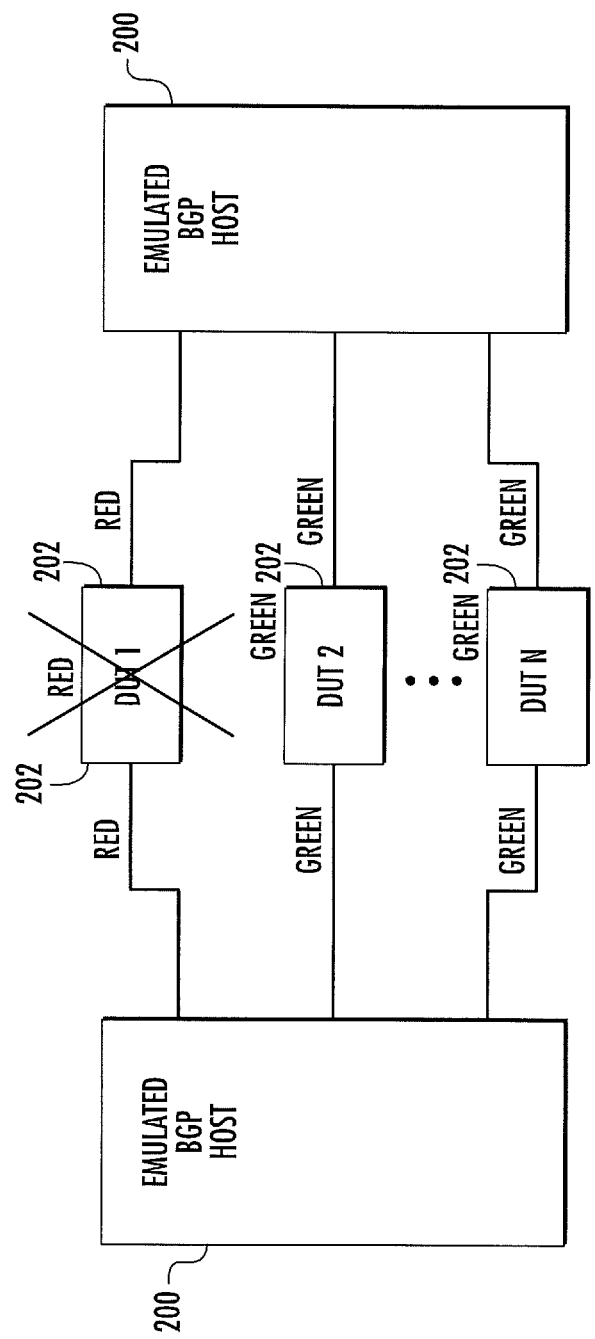
FIG. 3C is a network diagram illustrating an alternate method for conveying results of the connectivity test illustrated in FIG. 3A according to an embodiment of the subject matter described herein.
Figure 3E:
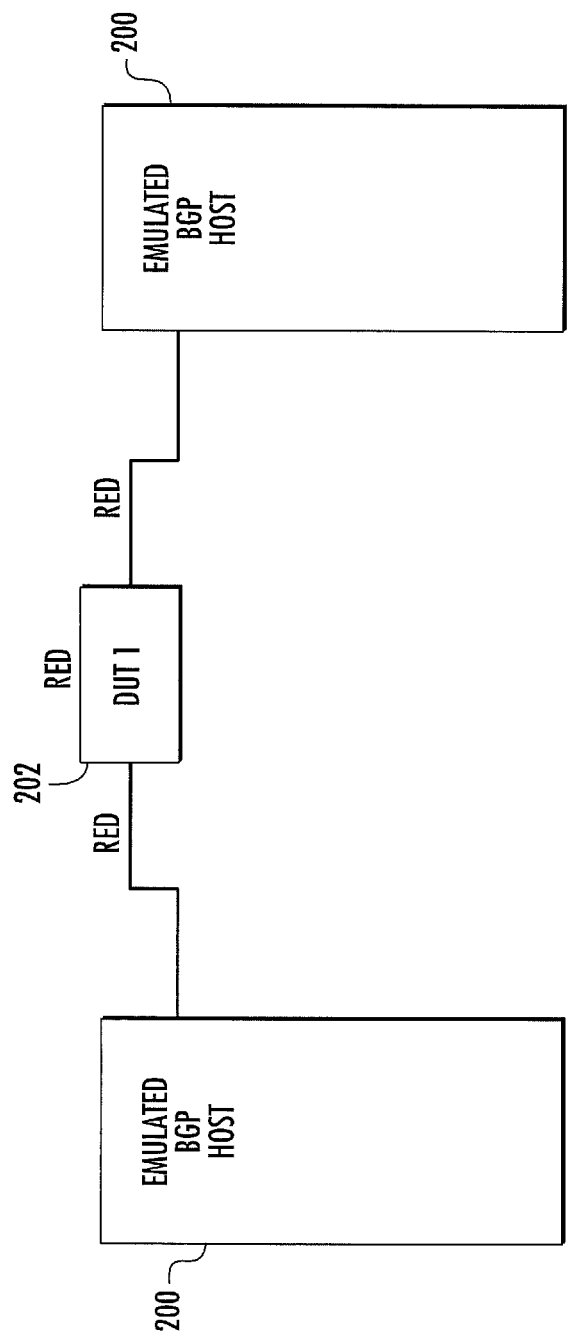
FIG. 3E is a network diagram illustrating yet another method for conveying results of the connectivity test illustrated in FIG. 3A according to an embodiment of the subject matter described herein.

FIG. 3C illustrates yet another mechanism for conveying results of the connectivity test in FIG. 3A to a user. In FIG. 3C, DUT 1, which caused the error, is obfuscated by an X. In yet another example, DUT 1 may be omitted, and remaining DUTs may be shown, as illustrated in FIG. 3D. In FIG. 3E, only the DUT and links that caused the error are shown. In FIG. 3E, the link and the DUT that caused the error may be color coded in red to indicate unsuccessful completion of the connectivity test.

The subject matter described herein is not limited to the mechanisms illustrated in FIGS. 3B-3E for displaying results of the background connectivity test. Any mechanism for conveying results of the background connectivity test to the user is intended to be within the scope of the subject matter described herein.

Figure 4A:
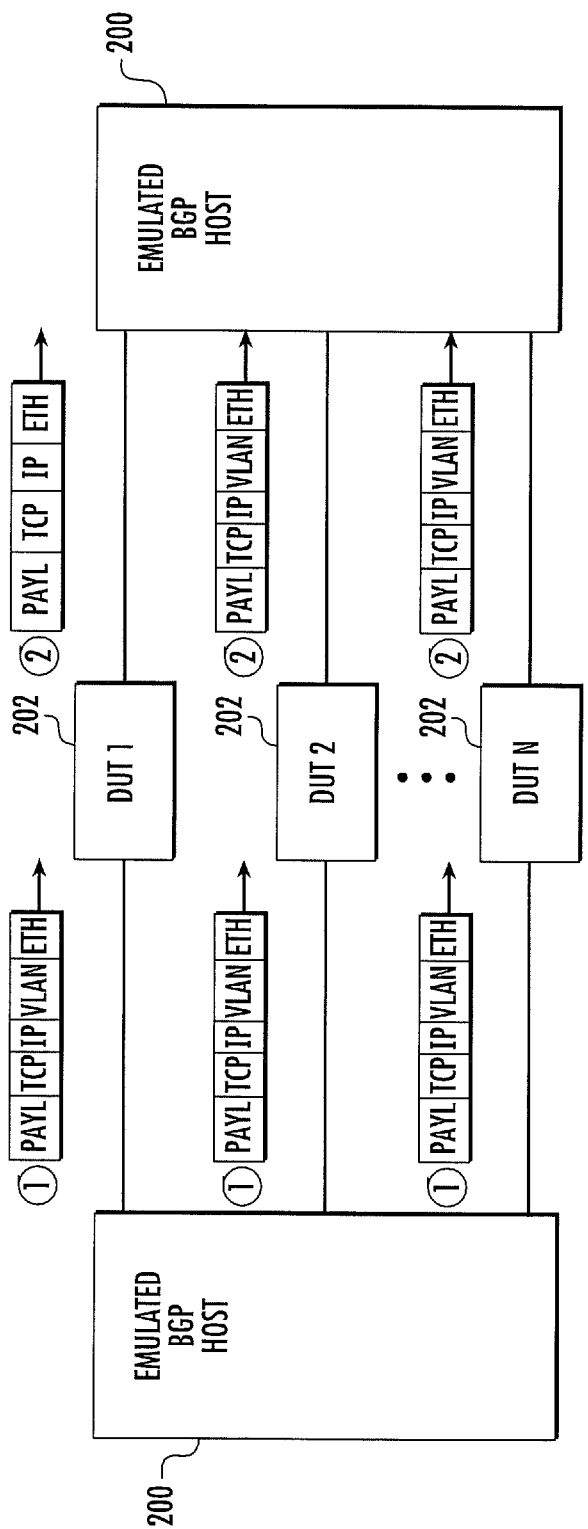
FIG. 4A illustrates a protocol conformance background test according to an embodiment of the subject matter described herein.

Another type of background testing that may be automatically performed by network equipment test device 200 during an idle time period is protocol conformance testing. In protocol conformance testing, it may be useful to determine whether a device under test properly formats a packet protocol header. FIG. 4A illustrates an example of protocol conformance testing that may be automatically performed by network equipment test device 200 during an idle time period according to an embodiment of the subject matter described herein. In FIG. 4A, network equipment test device 200 transmits packets through devices under test 202. The packets include packet headers, which in the illustrated example include an Ethernet header, a VLAN tag, an IP header, a TCP header. The packets may also include payloads. The packet payloads may include information that is typically used by network equipment test devices 200 for testing purposes. However, when performing load or stress testing, devices under test 200 typically do not analyze packet header information for protocol conformance.

Figure 4B:
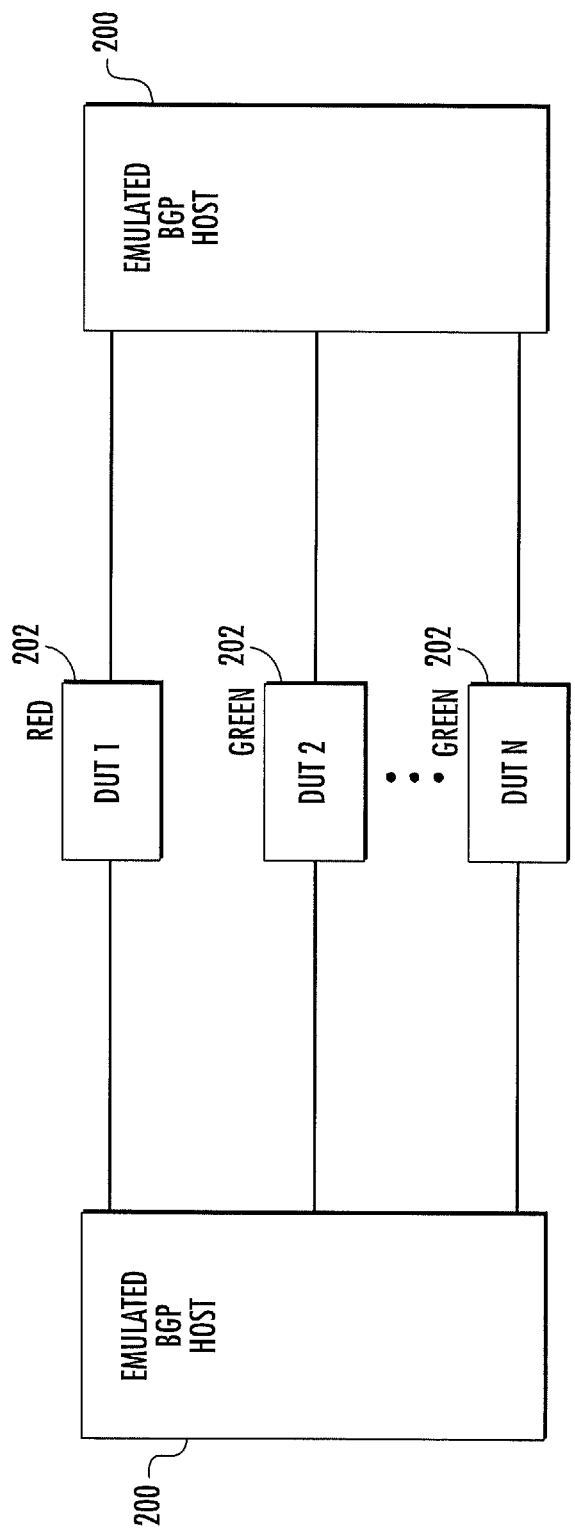
FIG. 4B is a diagram illustrating a method for conveying results of the conformance test illustrated in FIG. 3A according to an embodiment of the subject matter described herein.

In the illustrated example, device under test 1 omits the VLAN tag in the outbound packet that is transmitted to destination network equipment test device 200. Devices under test 2 through N properly include a VLAN tag in their outbound packets. Because device under test 1 did not include the VLAN tag in the outbound packet, DUT 1 is not conformant to the VLAN protocol, and this result may be conveyed to the user. FIG. 4B illustrates one method for conveying results of the conformance test to the user. In FIG. 4B, DUT 1 is color coded in red to indicate nonconformance with one or more protocols. DUTs 2 through N are coded in green to indicate protocol conformance. As with the connectivity test, alternate methods for outputting results of the protocol conformance test may be used without departing from the scope of the subject matter described herein.

Figure 5:
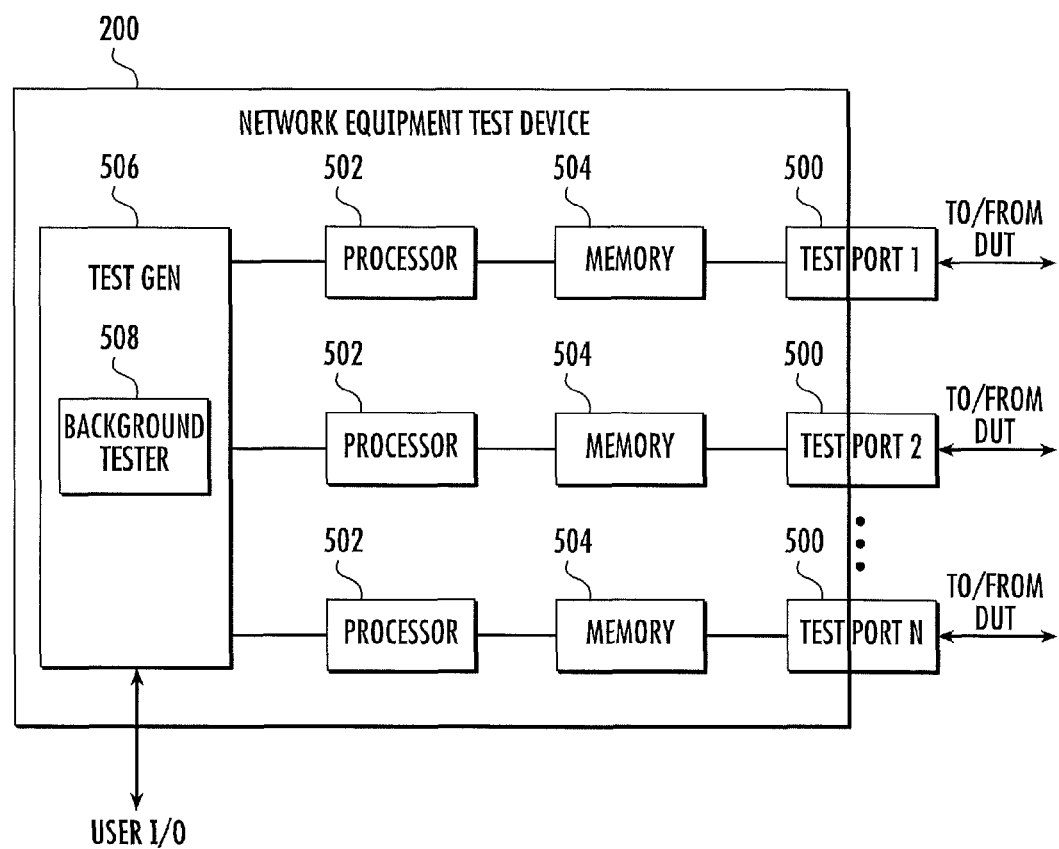
FIG. 5 is a block diagram of the network equipment test device according to an embodiment of the subject matter described herein.

FIG. 5 is a block diagram of a network equipment test device configured to automatically perform background testing of communications and storage network equipment according to an embodiment of the subject matter described herein. Referring to FIG. 5, network equipment test device 200 includes a plurality of test ports 500 that send packets to and receive packets from devices under test. Each port also includes a port processor 502 and associated memory 504. A test generator 506 receives input from the user, such as the control plane and data plane definitions described above and outputs tests to be executed by processors 502. Test generator 506 also includes a background tester 508 that performs the above described automatic background testing of communications or storage network equipment during idle time periods.

As described above, network equipment test device 200 comprises a special purpose computing platform that performs the technological function of communications and network storage device testing. For example, network equipment test device 200 may test communications network devices, such as routers, switches, firewalls, network address translators, and servers. Network equipment test device 200 may also test storage network equipment, including storage processors, file servers, etc. By automatically performing background testing of these devices, network equipment test device 200 increases the likelihood that such devices, when operating on live network traffic, will function correctly. Network equipment test device 200 may be used in a lab environment to test communications and storage network devices when such devices are not processing live network traffic. Network equipment test device 200 may also be used to troubleshoot communications and storage network devices that are processing live traffic by automatically implementing the background testing described herein during idle time periods when sufficient processing resources exist to execute the background tests.

Figure 6:
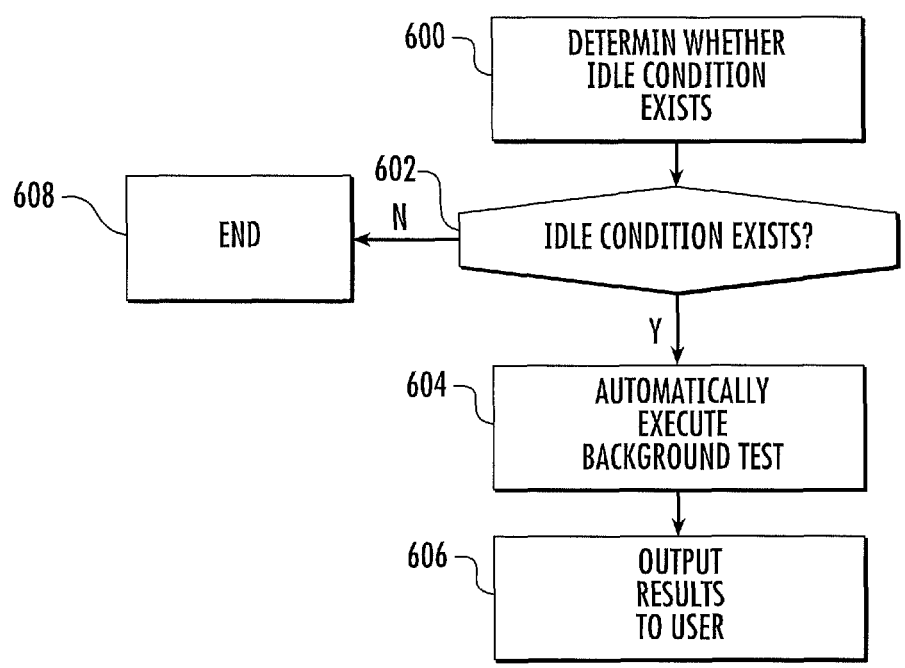
FIG. 6 is a flow chart illustrating an exemplary process according to an embodiment of the subject matter described herein.

As stated above, network equipment test device 200 automatically implements background testing during idle time periods, where an idle time period may be a time period where no other tests are being executed by network equipment test device or when other tests are being executed but sufficient processing resources are available to execute the background tests. In one embodiment, network equipment test device 200 may continually monitor the processing capacity of the processors implementing network testing to determine whether an idle condition exists and execute background tests automatically whenever such conditions exist. FIG. 6 is a flow chart illustrating an exemplary process that may be performed by network equipment test device in determining whether an idle condition exists and automatically executing a background test when such a condition exists. Referring to FIG. 6, in step 600 and 602, network equipment test device may determine whether an idle condition exists. These steps may be performed by monitoring the processing resources of port processors 502 to determine whether they either have sufficient capacity to execute a background test or whether they are nearly or completely idle. If an idle condition does not exist, the process ends.

If an idle condition exists, control proceeds to step 604 where a background test is automatically executed. Automatically executing the background test may include executing any of the tests described herein without requiring manual user input to initiate the tests. In step 606, the results of the background test are output to the user. If a data plane test is in progress, the results may be output on the same screen as the data plane test to indicate successful or unsuccessful completion of the background test, which may facilitate interpretation of results of a concurrent or future data plane test.

Although the examples described above relate to automatically performing connectivity and conformance testing during idle time periods, the subject matter described herein is not limited to performing connectivity and protocol conformance testing. Any test that can be automatically performed during an idle time period of network equipment test device resources is intended to be within the scope of the subject matter described herein.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for background testing of communications or storage network equipment, the method comprising:
   in a network equipment test device:
      receiving a control plane definition from a user, the control plane definition specifying emulated network equipment and network protocols executed by the emulated network equipment; and
      after receiving the control plane definition, automatically performing at least one background test during an idle time period by sending traffic from the emulated network equipment to at least one device under test and outputting results of the at least one background test to a user.

2. The method of claim 1 wherein automatically performing at least one background test during the idle time period includes performing the at least one background test prior to executing a first data plane test.

3. The method of claim 1 wherein automatically performing the at least one background test during an idle time period includes performing the at least one background between successive data plane tests.

4. The method of claim 1 wherein automatically performing the at least one background test during an idle time period includes performing the at least one background test during a data plane test.

5. The method of claim 1 wherein automatically performing the at least one background test during an idle time period includes determining whether sufficient processing resources exist to perform the background test during a data plane test, and, in response to determining that sufficient processing resources exist to perform the at least one background test, performing the at least one background test during the data plane test.

6. The method of claim 1 wherein automatically performing the at least one background test during an idle time period includes performing the at least one background test after data plane testing is complete.

7. The method of claim 1 wherein automatically performing at least one background test includes performing a connectivity test by sending packets from the emulated network equipment to the at least one device under test.

8. The method of claim 7 wherein performing a connectivity test includes performing a connectivity test for each link between the emulated network equipment and the at least one device under test.

9. The method of claim 8 wherein outputting results of the test to a user includes graphically displaying reachable nodes to the user.

10. The method of claim 8 wherein outputting results of the test to the user includes graphically displaying unreachable nodes to the user.

11. The method of claim 8 wherein outputting results of the test to a user includes color coding links to reflect reachable or unreachable status.

12. The method of claim 1 wherein performing at least one background test includes performing a protocol conformance test.

13. The method of claim 12 wherein performing a protocol conformance test includes transmitting a packet from the emulated network equipment to the at least one device under test and, receiving a packet from the at least one device under test and determining whether a header in the received packet conforms with an expected header.

14. The method of claim 1 comprising executing a data plane test in response to successful execution of the at least one background test.

15. A system for background testing of communications or storage network equipment, the system comprising:
  a network equipment test device including:
    a test generator for receiving a control plane definition from a user, the control plane definition specifying emulated network equipment and network protocols executed by the emulated network equipment; and
    a background tester for, after receiving the control plane definition and during an idle time period, automatically performing at least one background test by sending traffic from the emulated network equipment to at least one device under test and outputting results of the at least one background test to a user.

16. The system of claim 15 wherein the background tester is configured to perform the at least one background test after receiving the control plane definition and before executing a first user defined data plane test.

17. The system of claim 15 wherein the background tester is configured to perform the at least one background test during a data plane test.

18. The system of claim 15 wherein the background tester is configured to determine whether sufficient processing resources exist to perform the at least one background test during a data plane test, and, in response to determining that sufficient processing resources exist to perform the at least one background test, perform the background test during the data plane test.

19. The system of claim 15 wherein the background tester is configured to perform the at least one background test after data plane testing is complete.

20. The system of claim 15 wherein the background tester is configured to automatically perform the at least one background test during or between successive data plane tests.

21. The system of claim 16 wherein the background tester is configured to perform a connectivity test by sending packets from the emulated network equipment to the at least one device under test.

22. The system of claim 21 wherein the background tester is configured to perform the connectivity test for each link between the emulated network equipment and the at least one device under test.

23. The system of claim 21 wherein the background tester is configured to graphically display reachable nodes to the user.

24. The system of claim 21 wherein the background tester is configured to graphically display unreachable nodes to the user.

25. The system of claim 22 wherein the background tester is configured to color code the links to reflect reachable or unreachable status.

26. The system of claim 16 wherein the background tester is configured to perform a protocol conformance test.

27. The system of claim 26 wherein the background tester is configured to transmit a packet from the emulated network equipment to the at least one device under test and, receiving a packet from the at least one device under test and determining whether a header in the received packet conforms with an expected header.

28. The system of claim 16 wherein the network equipment test device is configured to execute a data plane test in response to successful execution of the at least one background test.

29. A nontransitory computer readable medium having stored thereon executable instructions that when executed by the processor or computer control the computer to perform steps comprising:
  in a network equipment test device:
    receiving a control plane definition from a user, the control claim definition specifying emulated network equipment and network protocols executed by the emulated network equipment; and
    after receiving the control plane definition, automatically performing at least one background test during an idle time period by sending traffic from the emulated network equipment to at least one device under test and outputting results of the at least one background test to a user.

* * * * *